(12) United States Patent
DeBuhr et al.

(10) Patent No.: US 8,308,114 B2
(45) Date of Patent: Nov. 13, 2012

(54) ELECTRONIC FLIGHT BAG MOUNTING BRACKET

(75) Inventors: Merritte DeBuhr, Greenfield, WI (US);
Jeffrey Bitant, Franklin, WI (US);
Daniel Richards, Greendale, WI (US)

(73) Assignee: Tensolite LLC, Saint Augustine, FL (US)

( * ) Notice: Subject to any disclaimer, the term of this patent is extended or adjusted under 35 U.S.C. 154(b) by 209 days.

(21) Appl. No.: 12/392,275

(22) Filed: Feb. 25, 2009

(65) Prior Publication Data

US 2011/0278415 A1    Nov. 17, 2011

(51) Int. Cl.
*F16M 11/06* (2006.01)

(52) U.S. Cl. ............... 248/188.1; 248/176.1; 248/177.1; 248/346.03; 248/918; 248/126; 248/424; 248/429

(58) Field of Classification Search .......... 248/917–923, 248/188.1, 176.1, 286.1, 287.1, 297.1, 298.1, 248/124.1, 124.2, 177.1, 346.03, 346.01, 248/424, 429, 126
See application file for complete search history.

(56) References Cited

U.S. PATENT DOCUMENTS

| | | | |
|---|---|---|---|
| 687,183 A | 11/1901 | Kolander | |
| 2,011,251 A | 8/1935 | Michelson | |
| 4,615,516 A * | 10/1986 | Stulberg et al. | ................ 5/650 |
| 5,116,008 A * | 5/1992 | Allen | ..................... 248/286.1 |
| 5,279,488 A | 1/1994 | Fleming | |
| 5,466,078 A | 11/1995 | Szmanda | |
| 5,582,379 A * | 12/1996 | Keselman et al. | ......... 248/279.1 |
| 5,732,912 A | 3/1998 | Nomura et al. | |
| 5,769,369 A | 6/1998 | Meinel | |
| 5,845,885 A | 12/1998 | Carnevali | |
| 6,352,228 B1 * | 3/2002 | Buerklin | ................... 248/181.1 |
| 6,561,476 B2 | 5/2003 | Carnevali | |
| 6,585,212 B2 | 7/2003 | Carnevali | |
| 6,588,719 B1 | 7/2003 | Tubach | |
| 6,597,294 B1 | 7/2003 | Ariens | |
| 6,840,487 B2 | 1/2005 | Carnevali | |
| 6,871,984 B2 * | 3/2005 | Chang et al. | .................. 362/419 |
| 7,017,243 B2 | 3/2006 | Carnevali | |
| 7,380,299 B1 * | 6/2008 | DeMayo | ........................ 5/648 |
| 7,464,906 B2 * | 12/2008 | Temperato et al. | ......... 248/181.1 |
| 7,686,250 B2 | 3/2010 | Fortes et al. | |
| 7,748,670 B1 * | 7/2010 | Veldez | ....................... 248/181.1 |
| 2007/0023593 A1 * | 2/2007 | Fedewa | ....................... 248/201 |
| 2008/0295301 A1 | 12/2008 | Carnevali | |

OTHER PUBLICATIONS

Three-page International Search Report dated Jun. 2, 2010 for PCT/US2010/025320.

* cited by examiner

*Primary Examiner* — Amy J. Sterling (74) *Attorney, Agent, or Firm* — Wood, Herron & Evans, LLP (57) ABSTRACT

A mounting bracket for an electronic flight bag (EFB) includes a frame having a track and a mounting assembly that is having a base and a support that is moveably connected to the base and can be selectively fixed in position on the track. The mounting bracket may allow for singlehanded adjustment of the position of the mounting assembly with respect to track at one of at least two discrete locations along the track, or at any desired position along the track. Further, the mounting bracket may provide a single mechanism for both securing the EFB to the mounting assembly and orienting the support with respect to the base.

16 Claims, 7 Drawing Sheets

ELECTRONIC FLIGHT BAG MOUNTING BRACKET

BACKGROUND OF THE INVENTION

1. Field of the Invention

The present invention relates in general to a mounting bracket for an electronic display device such as an electronic flight bag (EFB).

2. Discussion of the Related Art

An EFB is an electronic display device that a pilot may use for preflight check lists and similar activities. EFB's are generally handheld, portable devices that a pilot can take from flight to flight. Information regarding a pilot's flight or flights may be preloaded onto the EFB so that the pilot may access it prior to, during and after the flight.

In the past, a pilot simply may have placed an EFB loosely within the cockpit of an airplane, e.g., on the floor, which may lead to problems during the flight. For example, the EFB may become lost among other items in the cockpit, or the position of the EFB may shift during the flight. Further, if there is turbulence, the EFB may become damaged if it is not secured within the cockpit.

Partially in response to these concerns, the U.S. Federal Aviation Administration (FAA) has published guidelines designating three separate classes of EFB hardware approved for use under progressively more demanding conditions. Specifically, Class 1—These devices are standard commercial-off-the-shelf (COTS) equipment such as laptops or handheld electronic devices. These devices are used as loose equipment and are typically stowed during critical phases of flight. A Class 1 EFB is considered a Portable Electronic Device (PED). These may connect to aircraft power and interface to other systems via certified (STC) docking station and/or power source. This would allow the Class 1 device to interface with other systems through the certified interface and other devices through an expansion port interface.

Class 2—These are also Portable Electronic Devices, and range from modified COTS equipment to purpose-built devices. They are typically mounted in the aircraft with the display being viewable to the pilot during all phases of flight. Mounts may include certified structural mounting devices or kneeboard devices. These devices may connect to aircraft power and data sources, e.g. through an ARINC 429 interface. A Class 2 EFB can be used for bi-directional data communication with other aircraft systems. In this class, a single LRU device would be an optimal solution based on the ease of installation and replacement.

Class 3—These devices are considered "installed equipment" and are subject to airworthiness requirements. Unlike PEDs, they must be under design control. The hardware is subject to a limited number of RTCA DO-160E requirements (for non-essential equipment—typical crash safety and Conducted and Radiated Emissions (EMC) testing). There may be DO-178 requirements for software, but this depends on the application-type defined in the Advisory Circular. Class 3 EFBs are typically installed under STC or other airworthiness approval.

Brackets used in Class 2 and class 3 hardware typically do not permit easy removal of the electronic equipment. The orientation and/or position of the electronic equipment also cannot easily be changed to accommodate user preference. Those brackets that do permit adjustment require considerable manipulation with both hands, which can be distracting and inconvenient for the pilot or other operator.

What is needed is a mounting bracket that may be secured to a substrate, e.g., the wall of the cockpit, to which an EFB may be releasably attached. Further, what is needed is a mounting bracket with a mounting bracket that may allow for the user to adjust the EFB to a desired position. Still further, what is needed is a mounting bracket that may allow for one-handed adjustment of the position and/or orientation of the EFB.

SUMMARY AND OBJECTS OF THE INVENTION

By way of summary, a first aspect of the present invention is directed to an EFB mounting bracket that may move laterally along a track so as to offer the pilot the option of positioning the mounting assembly at any one of a number of discrete positions along a track or at any desired location on the track between the discrete positions.

Another aspect, that may be implemented either alone or in conjunction with the first aspect, permits one-handed operation of the mounting bracket, e.g., a user may adjust and secure the position of the mounting bracket using only one hand. A further aspect of the invention is to provide a single mechanism that both secures the position of the mounting assembly with respect to the track and that mounts the EFB on the mounting assembly.

A yet further aspect which, like the others, may be implemented either alone or in conjunction with one or more of the other aspects, is to provide a mounting bracket that has one or more of the characteristics discussed above but which is relatively simple and inexpensive to manufacture and assemble using a minimum of equipment.

In one implementation, a mounting bracket is provided that comprises an assembly or a frame having a track and a mounting assembly comprising a base and a support. The support is moveably connected to the base, and the position of the support with respect to the base is adjustable. The mounting assembly is configured to slideably engage the track. The position of the mounting assembly in relation to the frame is adjustable. In one preferred embodiment, the track has a plurality of discreet positions for receiving the mounting assembly. The mounting assembly can be secured to the track between the discreet positions using a first positioning mechanism and to one of the discreet positions using a second positioning mechanism, either alone or in conjunction with the first positioning mechanism.

These and other aspects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

DESCRIPTION OF PREFERRED EMBODIMENTS

The present invention and the various features and advantageous details thereof are explained more fully with reference to the non-limiting embodiments described in detail in the following description.

Figure 1:
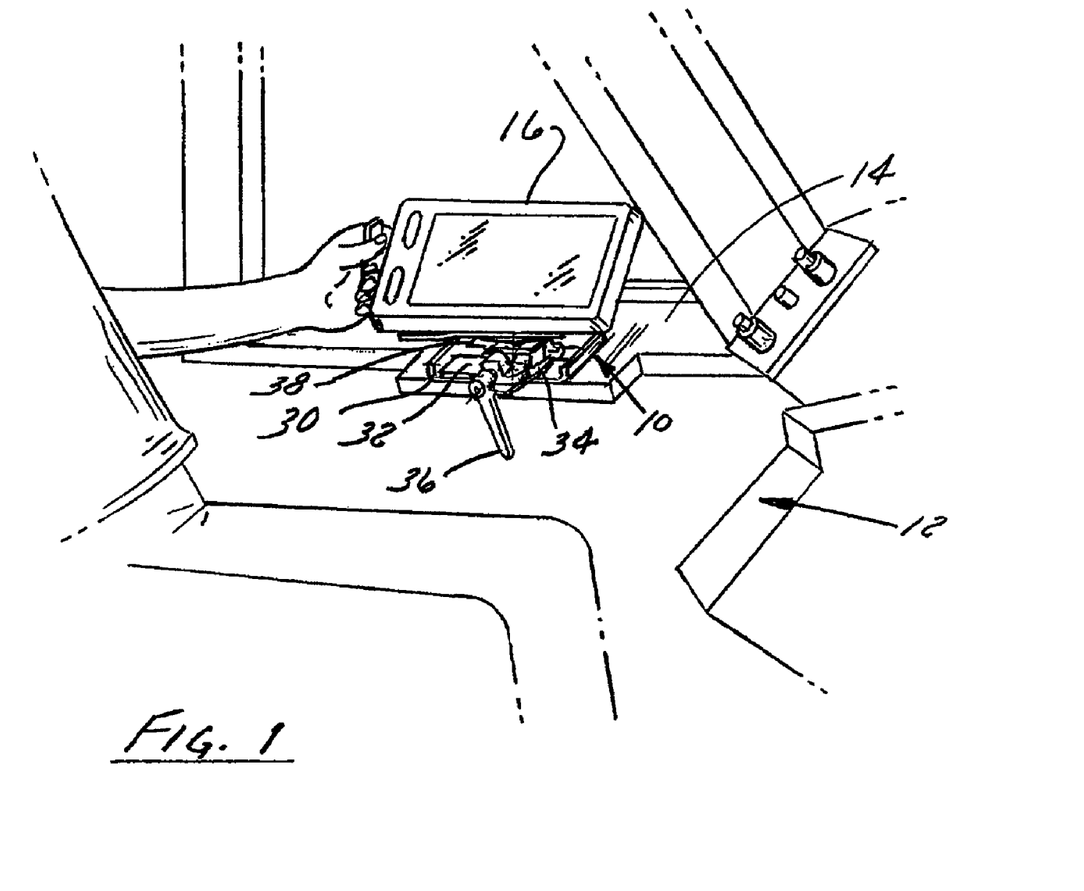
FIG. 1 is a perspective view of one embodiment of an electronic flight bag (EFB) mounting bracket constructed in accordance with the invention, showing the bracket bearing an EFB and mounted in an airplane cockpit.

As shown in FIG. 1, the mounting bracket 10 is mounted in a cockpit 12 of an airplane, preferably on a substrate 14 such as a ledge or other location that is easily accessible by a seated pilot. Mounting bracket 10 generally comprises a frame 30 with a track 32 and a mounting assembly 34 that is configured to slidably engage the track 32. First and second positioning mechanisms 36 and 38 provide continuous and discrete positioning, respectively, of the mounting assembly 34 along the track 32.

The size and shape of the frame 30 may vary, but it preferably is generally rectangular in shape with the track 32 spanning the length of the rectangle to allow for a greater number of potential positions for the mounting assembly with respect to the track. The dimensions of the frame 30 may vary but preferably the frame has a length of between about 4" and about 12", and more preferably about 7", a width of between about 2.5" and 5", and more preferably about 3.33", and a thickness of between about 1.5" and 2.5", and more preferably about 2". The frame 30 may be made of any suitable material that is capable of being rigidly secured to the substrate 14. Preferably, the frame 30 is made of aluminum.

Figure 2:
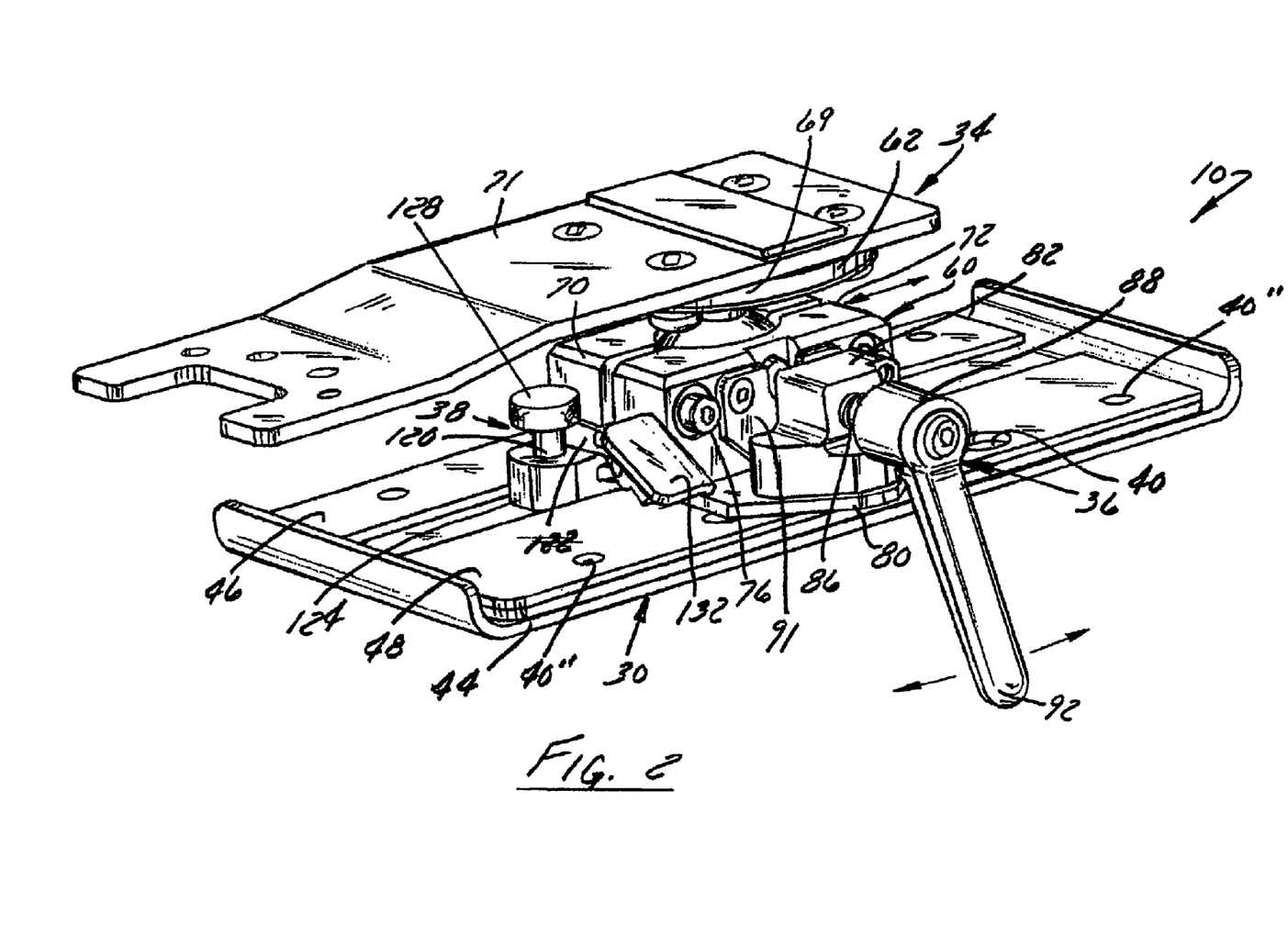
FIG. 2 is a perspective view of the EFB mounting bracket of FIG. 1.
Figure 3:
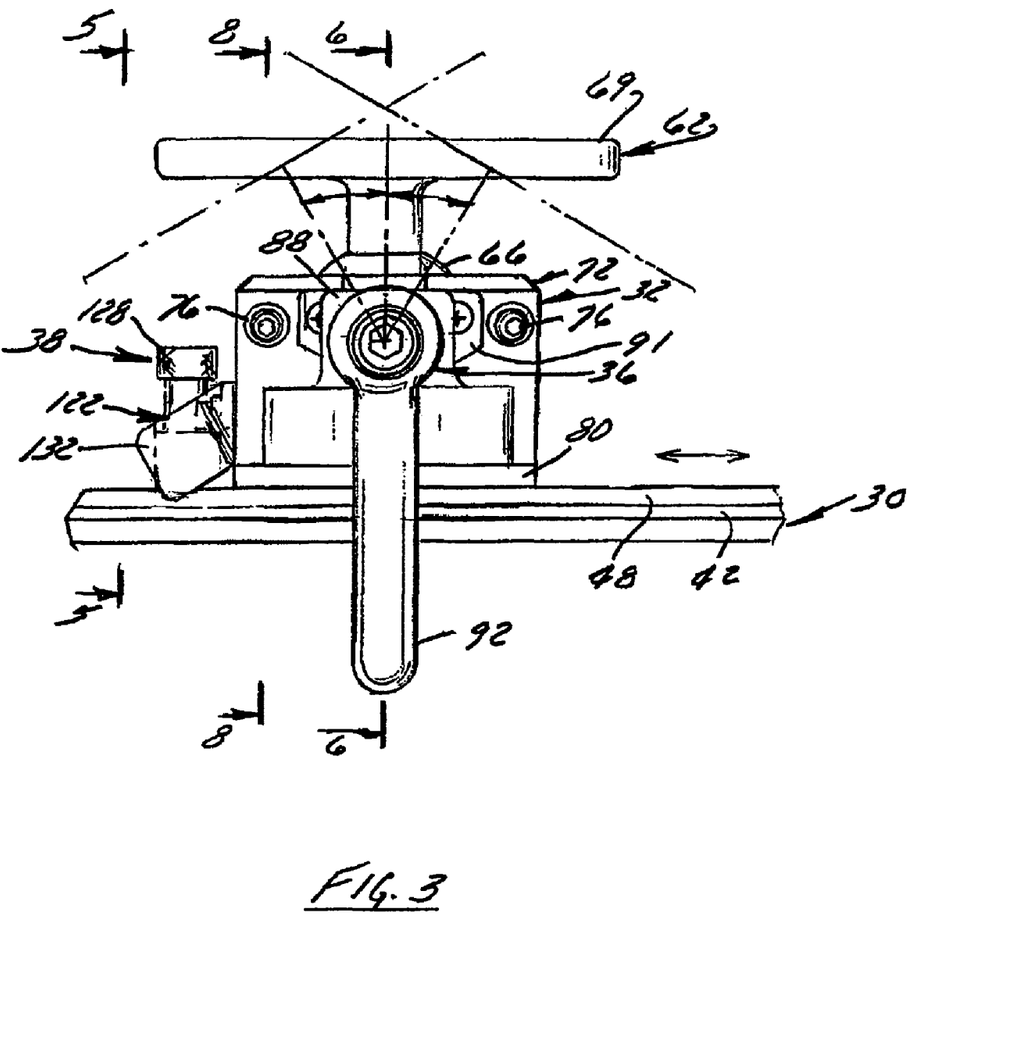
FIG. 3 is a front side elevation view of the EFB mounting bracket.
Figure 4:
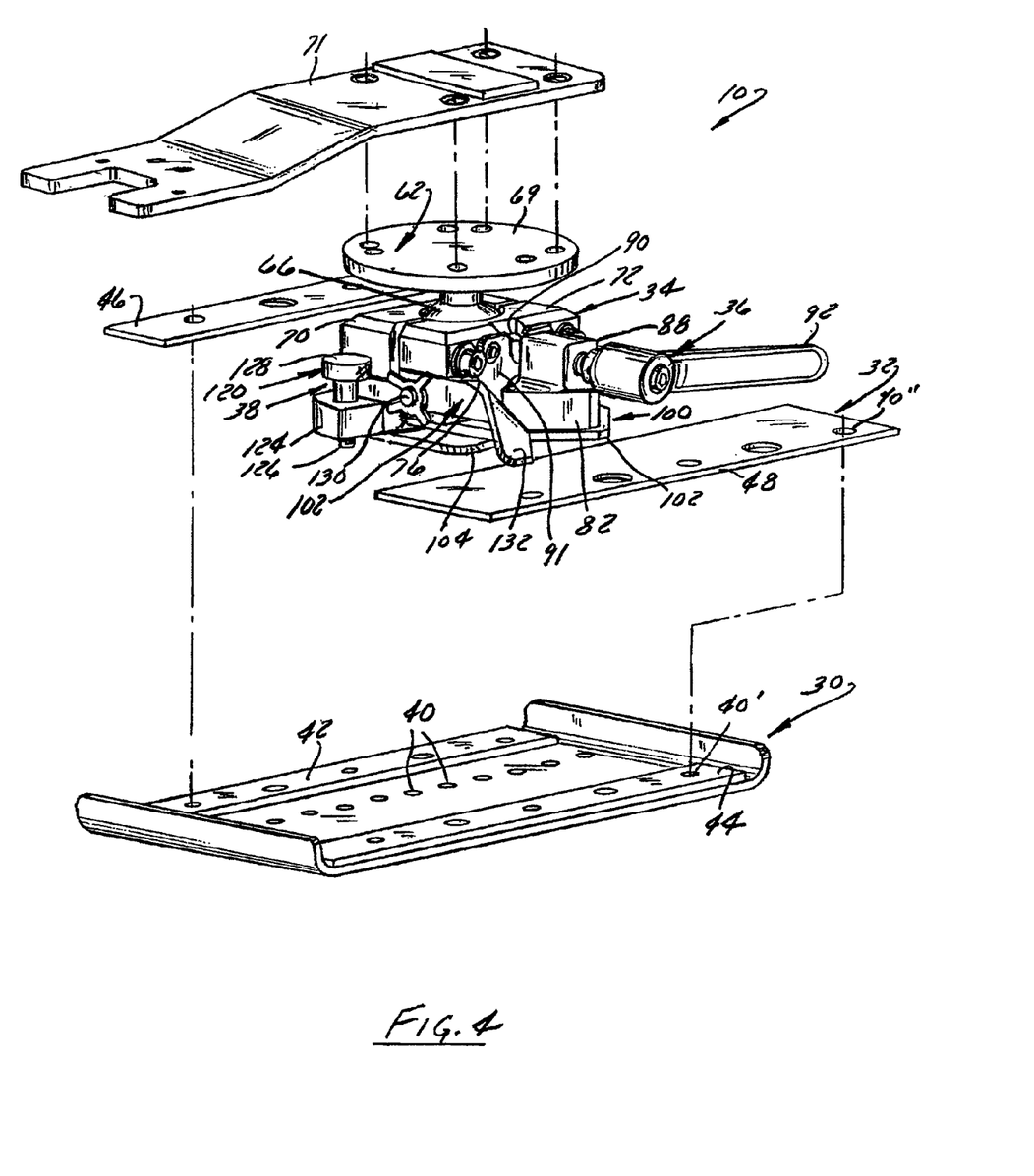
FIG. 4 is an exploded perspective view of a mounting assembly of the mounting bracket.
Figure 5:
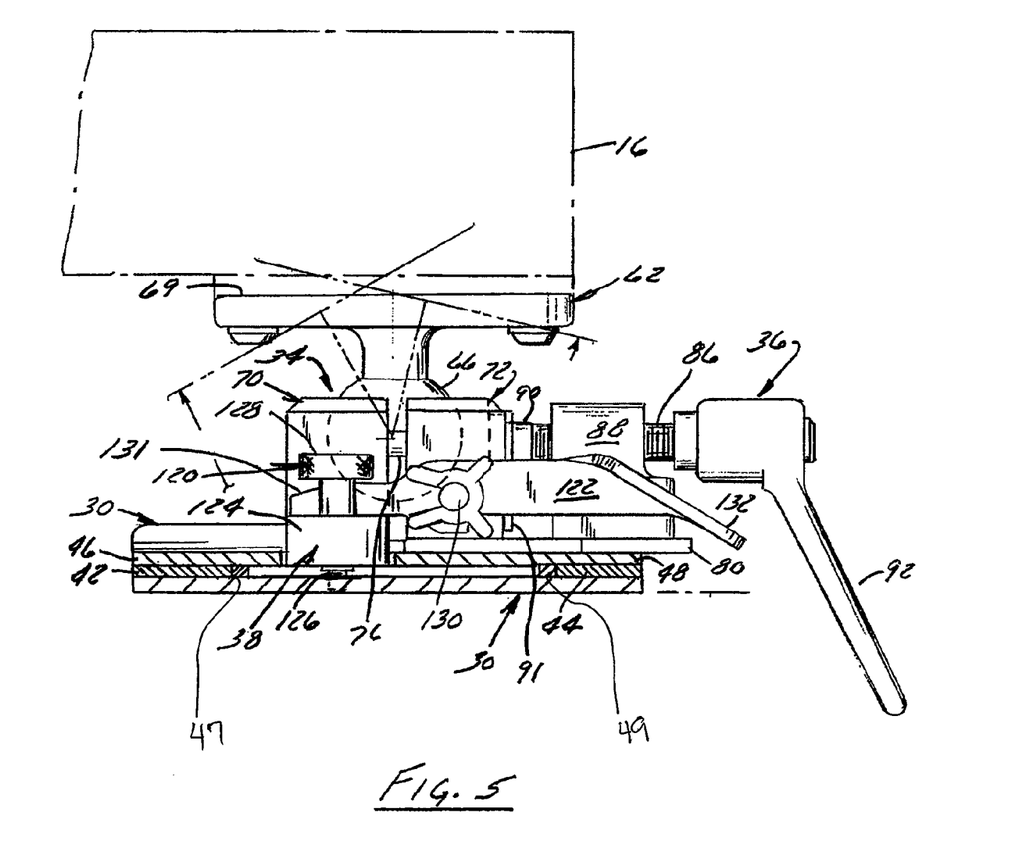
FIG. 5 is a side sectional elevation view of the EFB mounting bracket, taken generally along the lines 5-5 in FIG. 3.

As shown in FIGS. 2-4, the frame 30 has a plurality of spaced holes 40' that are sized to receive corresponding fasteners, e.g., screws or nuts/bolts, so as to tightly secure the frame 30 at a desired location on the substrate 14 to avoid any undesired repositioning of the mounting bracket 10 that may occur, e.g., on account of turbulence during a flight.

As shown in FIGS. 2 and 4, the track 32 receives the mounting assembly 34 so as to selectively permit or prevent movement of the mounting assembly 34 along the track 32 while at least substantially preventing mounting assembly movement in other directions. The track 32 is formed by two track support plates 42, 44 and two top track plates 46, 48. The track support plates 42, 44 are preferably generally rectangular in shape and may be attached to the frame 30 by bolts, screws, adhesives, or any other suitable fasteners. Alternatively, the track support plates 42, 44 may be molded or machined in, welded to, or otherwise integral with the remainder of frame 30. The track support plates 42, 44 provide for a separation between the frame 30 and the mounting assembly 34, which allows for the mounting assembly 34 to slide along the track 32 more easily.

Referring to FIGS. 4-8, each of the two top track plates 46, 48 is wider than the associated track support plates 42, 44 and is mounted on a respective one of the two track support plates 42, 44 to provide a gap between the base of the frame 30 and the top track plates 46, 48. The top track plates 46, 48 of this embodiment are bolted to the track support plates 42, 44 but, conceivably, could be integral with the track support plates 42, 44 and/or the base of the frame 30. The top track plates 46, 48 facilitate sliding of the mounting assembly 34 along the track 32 and also facilitate selectively securing the mounting assembly 34 at a desired location along the track 32. Specifically, as discussed below in more detail, the mounting assembly 34 has a plate 104 configured to fit within the gap between the base of frame 30 and the top track support plates 46, 48, which may serve to hold the mounting assembly 34 on the frame 30 and guide the mounting assembly 34 along the track 32. Two DELRIN® strips, part 47, 49 FIG. 5, allow assembly 34 to translate smoothly with the moment caused by one-handed operation.

Further, the top track plates 46, 48 and the track support plates 42, 44 may have holes 40', 40" that mate with the holes 40' in the frame 30. Thus, the each of the fasteners that may secure the frame 30 to substrate 14 also may extend through a top track plate 46, 48, a track support plates 42, 44, and the frame 30 and into the substrate 14.

Referring hereto FIGS. 2-5 and 9, the mounting assembly 34 generally comprises two components: a base 60 and a support 62.

Referring to FIGS. 2-9, the base 60 has features which engage the track 32 and enable the mounting assembly 34 to slide along the track 32 and to be selectively secured at a desired position along the track. The base 60 may also have features that allow for the orientation of the support 62 to be adjusted. The base 60 and support 62 of this embodiment have a ball 66 and socket 68, respectively. The ball 66 preferably is coated with a layer 67 of rubber (FIG. 9) or a similarly compressible substance to facilitate firm clamping within the socket 68. It should be noted that the ball 66 and the socket 68 could be mounted on the base 60 and the support 62, respectively, rather than vice versa and that the ball 66 and socket 68 could be replaced with other mating and releasably securable devices. In addition to terminating in the ball 66 at its lower end, the support 62 includes an upper support plate 69 for receiving the EFB 16. Depending on the size and configuration of the EFB, an optional adapter plate 71 (FIG. 2) may also be provided between the EFB 16 and the plate 69.

Figures 6, 7, 8:
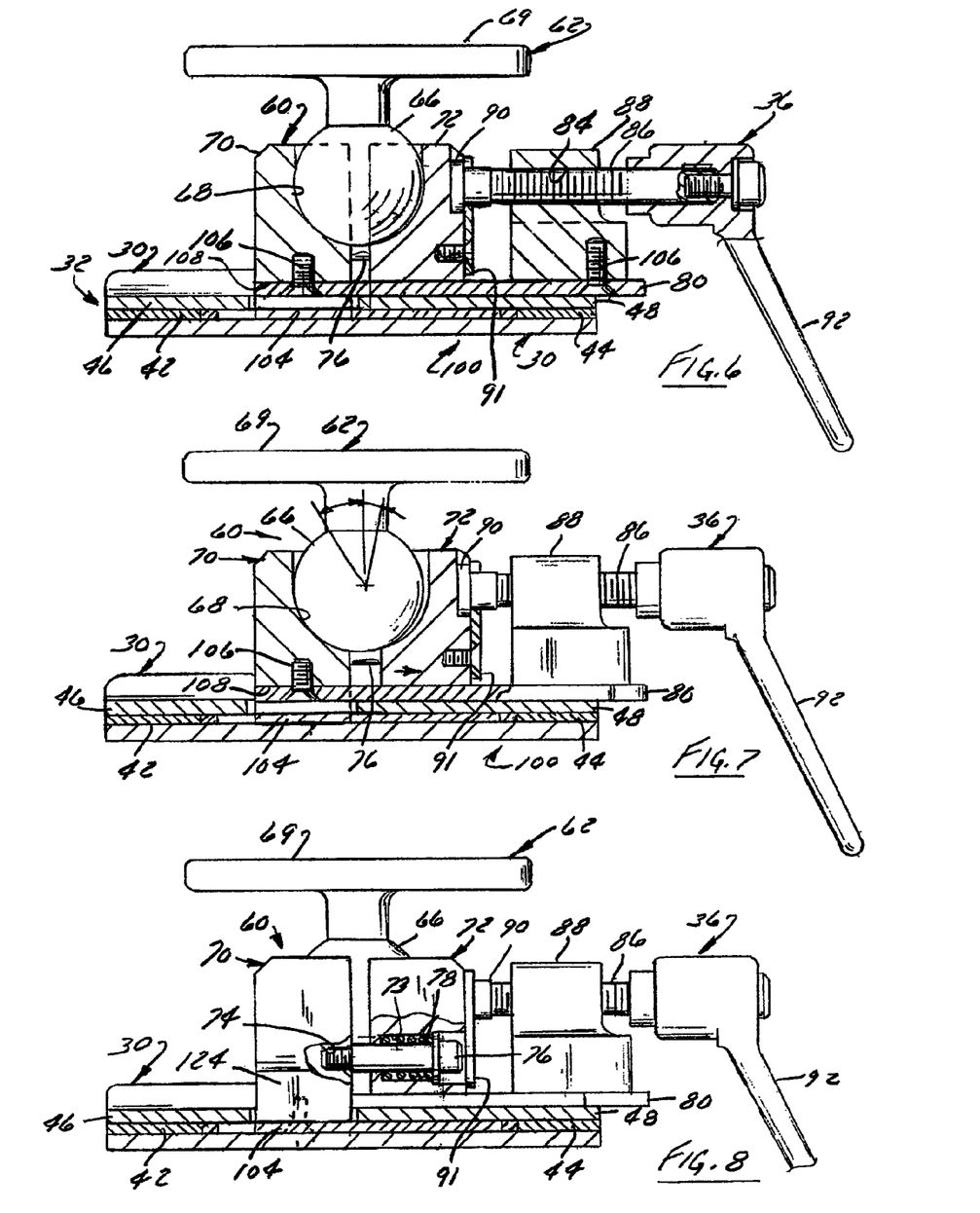
FIG. 6 is a side sectional elevation view of the EFB mounting bracket, taken generally along the lines 6-6 in FIG. 3.
FIG. 7 is a side sectional elevation view of the EFB mounting bracket, taken generally along the lines 6-6 in FIG. 3 and showing a clamp of the assembly in a moved position.
FIG. 8 is a side sectional elevation view of the EFB mounting bracket, taken generally along the lines 8-8 in FIG. 3.

The socket 68 of this embodiment is selectively loosenable to permit the pilot to adjust the orientation of the support 62 with respect to the base 60 and, hence to adjust the orientation of the EFB 16 relative to the vertical and horizontal planes. The range of possible adjustment will demand an overall bracket design and user preference. A range of 30° to 60° is preferred. To permit this adjustment, the base 60 comprises a first socket section 70 and a second socket section 72 that generally oppose one another and are relatively movable to expand and contract the socket 68. As shown in FIGS. 6-9, the first and second socket sections 70, 72 each form about one-half of the socket 68. The second socket section 72 is moveably attached to the first socket section 70. More specifically, in this embodiment, holes 74 in the first socket section 70 may be threaded to receive correspondingly threaded bolts 76 retained in bores 73 in the second socket section 72 as best seen in FIG. 8. The bolts 76 can be tightened to drive the second socket section 72 toward the first socket section 70 to secure the support 62 at a desired orientation relative to the base 60 by clamping the sides of the socket 68 against the ball 66. They can also be loosened to unclamp the sides of the socket 68 from the ball 66 and permit the orientation of the support 62 relative to the base 60 to be adjusted (compare FIG. 7 to FIG. 6). The rubber layer 67 on the ball 66 facilitates this adjustment by providing some resistance to ball rotation after the socket 68 has been partially loosened, hence assuring that the support 62 will remain in the desired orientation while the socket 68 is being retightened, even if the user lets go of the support 62. Further, the second section socket 72 may be biased toward the first socket section 70 using, for example, springs 78 (FIGS. 8 and 9) that are retained in counter bored sections of the bores 73 in the second section 72. Without this biasing and the friction provided by the rubber layer 67 on the ball 66, the support 62 might undesirably shift within the base 60 before the user can retighten the socket 68.

Figure 9:
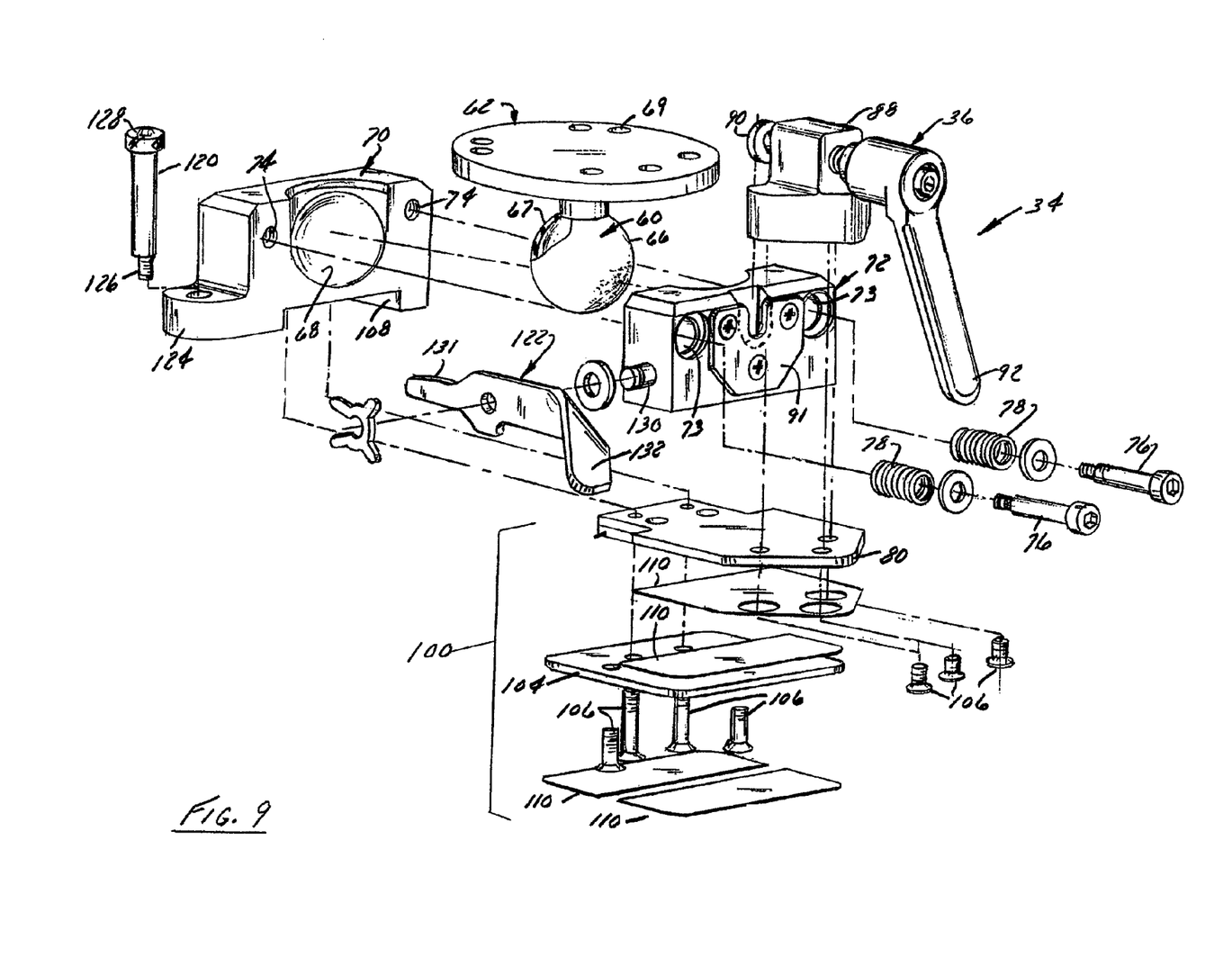
FIG. 9 is an exploded perspective view of the mounting bracket.

Additional loosening of the socket 68 can permit complete removal of the support 62 from the base 60 by moving the sides of the socket 68 sufficiently far apart to permit complete removal of the ball 66 from the socket 68 as seen in FIG. 9.

Referring again to FIGS. 5-9, the first infinitely adjustable positioning mechanism 36 of this embodiment takes the form of a clamp that includes a clamp plate 80 and a housing 82 that is attached to the clamp plate 80 outboard at the second socket section 72 in any desired manner. The housing 82 has a horizontal through hole 84 that is threaded to receive a threaded portion 86 of a crank 88. One end of the threaded portion 86 receives a cap 90 having a flat surface to abut the second socket section 72. The cap 90 is held to the second socket section 72 by a slotted retainer plate 91 to assure that the cap 90 and second socket section 72 move together. The other end of the crank 88 receives a handle 92. Accordingly, a pilot may turn the crank 88 in one direction in order to move the second socket section 72 toward the first socket section 70 as the cap 90 presses against the second socket section 72. Conversely, the user may turn the crank 88 in the opposite direction so as to permit the second socket section 72 to move away from the first socket section 70.

Referring to FIGS. 6, 7, and 9, the first socket section 70 of this embodiment is mounted on a sliding plate assembly 100 by fasteners 106. Plate assembly 100 includes the aforementioned clamp plate 80 and an underlying lower plate 104. The relatively narrow clamp plate 80 is received in a slot 108 formed in the central portion of the base of the first section 70. The relatively wide lower plate 104 is mounted to the bottom of the first socket section 70 outboard of the slot 108, hence providing a gap between the clamp plate 80 and lower plate 104 that is equal in depth to that of the slot 108. The top track plate 48 is inserted in this gap during bracket assembly, resulting in the top track plate 48 being sandwiched between the plates 80 and 104. This positioning permits sliding movement of the mounting assembly 34 along the track 32 while preventing other movement of the mounting assembly 34.

Referring again to FIGS. 6-9, the clamp plate 80 extends over the top of the top track plate 48 and slides along it during mounting assembly 34 position of adjustment. If desired, wear strips 110 (FIG. 9), made of tetrafluoroethylene or the like, may be provided between all mutually sliding surfaces to facilitate sliding movement of mounting the assembly 34 along the track 32. The second socket section 72 rests on top of the clamp plate 80 between the housing 82 and the first socket section 70 and is slideable relative to the clamp plate 80 during the aforementioned opening and closing of the socket 68. Finally, the housing 82 is bolted by fastener 106 to the clamp plate 80 outboard of the second socket section 72 but inboard of a cantilevered end of the clamp plate 80.

As mentioned above, the EFB mounting bracket 16 preferably is configured to permit one-handed positioning of the mounting assembly 34 in at least two discrete positions along the track 32 using the second positioning mechanism 38. Between adjustments, the mounting assembly 34 is held in a desired one of these two positions by both the first and second positioning mechanisms 36 and 38. In the illustrated embodiment, the first and second positioning mechanisms take the form of a clamp and a catch, respectively.

As shown in FIGS. 5-9 the clamp forming the first positioning mechanism 36 is responsive to clockwise rotation of the crank 88 against a fully-tightened second socket section 72 to clamp the mounting assembly 34 against the track 32. Specifically, this rotation causes the housing 82 to move away from the second socket section 72. This movement resiliently deflects the cantilevered end of the clamp plate 80 downwardly against the top track plate 48, thereby clamping the top track plate 48 between the plates 80 and 104 and clamping the mounting assembly 34 in position. To unclamp the mounting assembly 34 from the track 32, the operator simply rotates the crank 88 counterclockwise to relieve the tension from the clamp plate 80.

As shown in FIGS. 2, 4, 5, and 9, the catch forming the second positioning mechanism 38 includes a pin 120 that is selectively alignable with one of the several receptacles or holes 40 (FIG. 4) generally arranged in a line in the upper surface of the track 32. The pin 120 is retained in a selected one of the holes 40 and can be disengaged from it using a thumb lever 122. Each receptacle or hole 40 corresponds with a discrete location of the mounting assembly 34 with respect to the track 32. While the arrangement of the holes 40 may vary, the holes are preferably spaced about ½ inch apart. The pin 120 is retained in a collar 124 mounted on or formed integrally with the first socket section 70. The pin 120 has a bottom end 126 and a top end bearing a head 128. The thumb lever 122 is pivotally mounted on a pivot pin 130 on the side of the second socket section 72 at an intermediate position thereof, has a front end 131 extending beneath the head 128 of the pin 120, and has a rear end terminating in a thumb rest 132. The bottom 126 of the pin 120 normally extends downwardly from the collar 124 and into a selected one of the receptacles 40 to hold the mounting assembly 34 in place. When the pilot desires to adjust the position of the mounting assembly 34 relative to the track 32, he or she simply depresses the thumb rest 132 to pivot the thumb lever 122 about the pin 130 and drive the pin 120 upwardly to disengage its lower end 126 from the underlying receptacle 40. Assuming that the clamp 36 has been previously unclamped by operation of the crank 88, the pilot can then slide the mounting assembly 34 to a position in which the latch pin 120 is aligned with another desired receptacle 40 and release the thumb lever 122 to permit the latch pin 120 to engage the receptacle 40 by falling into place and, if desired, under the additional biasing force of a spring (not shown). Once the mounting assembly 34 is positioned at the desired location and the latch pin 120 is inserted in the desired hole 40, the mounting assembly 34 may be further secured at the location by turning the crank 88 clockwise to tighten the clamp 36.

It should be noted that, while, the receptacles 40 and catch comprise holes and a pin, respectively, in the illustrated embodiment, alternative selectively engageable couplers, such as detents and a dog, could be employed instead.

Finally, it should be noted that the mounting assembly 34 may, if desired, be clamped in a position in which the latch pin 120 is located between any two receptacles 40 by simply clamping the mounting assembly 34 in position by turning the crank 88 of the clamp 36. Hence, the mounting assembly 34 can be adjusted discretely using a combination of the clamp 36 and the catch 38 or infinitely using the clamp 36 alone.

Also, as should be apparent from the above, another feature of the present invention is to allow the pilot to position and secure the mounting assembly 34 with respect to the track 32 using only one hand. For example, the pilot may turn the crank 88 to loosen the mounting assembly 34 and raise the latch pin 120 from a hole 40 at the discrete location (assuming the mounting assembly is so positioned). The pilot then can slide the mounting assembly 34 to a different desired position, reinsert the latch pin 120, and turn the crank 88 to secure the mounting assembly 34, all while using only one hand.

Another feature of the present invention is to provide a single mechanism 36 for clamping the mounting assembly 34 in place and for securing the position of the support 60 with respect to the base 62. As discussed above, such a configuration may allow for easy, single-hand adjustment of both the position of the mounting assembly 34 as well as the attitude of the support 62.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept. In addition, the individual components need not be fabricated from the disclosed materials, but could be fabricated from virtually any suitable materials.

Moreover, the individual components need not be formed in the disclosed shapes, or assembled in the disclosed configuration, but could be provided in virtually any shape, and assembled in virtually any configuration, so as to provide the advantages and benefits described above Further, although several of the components are described herein is a physically separate module, it will be manifest that components may be integrated into the apparatus with which it is associated. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements.

What is claimed is:

1. A mounting bracket for supporting an electronic flight bag (EFB) component comprising:
   a frame having a track;
   a mounting assembly slidably engaging the track to slide thereon;
   the mounting assembly including a base and a support movably coupled with the base and configured for supporting the EFB component;
   a first positioning mechanism, the first positioning mechanism having an element that is moveable to engage the mounting assembly base to secure the support in a position with the base, the first positioning mechanism further including a lockable clamp and the element further moveable to further engage the base to clamp the mounting assembly against the track and simultaneously secure the mounting assembly in a position on the track, wherein the first positioning mechanism can be selectively actuated to secure the mounting assembly at any of a number of continuous positions along the track;
   a second positioning mechanism that is configured to be selectively actuated to secure the mounting assembly at any of a number of discrete positions along the track.

2. The mounting bracket according to claim 1, wherein the base comprises a first section and a second section, at least one of first section and second section being movable relative to the other to be moved when the first positioning mechanism element is moved to engage the base to thereby selectively clamp the support and secure the support in the position on the base.

3. The mounting bracket according to claim 1, wherein the mounting assembly includes:
   an upper plate;
   a housing attached to the upper plate; and
   a lower plate, wherein a gap is formed between the lower plate and the upper plate.

4. The mounting bracket according to claim 3, wherein the first positioning mechanism includes a crank movable in the housing, the movement of the crank in one direction engaging the base to secure the support at a desired orientation relative to the base.

5. The mounting bracket according to claim 4, wherein further moving the crank in the one direction causes the upper plate to flex and secure the lower plate between the track and the upper plate, and thereby, simultaneously secure the mounting assembly at a desired position on the track.

6. The mounting bracket according to claim 4, wherein moving the crank in the opposite direction allows for removal of the support from the base.

7. The mounting bracket according to claim 1, where the support is movably coupled with the base with a ball and socket mechanism.

8. The mounting bracket according to claim 1, wherein the track has a plurality of discreet positions in which the mounting assembly can be secured in place with respect to the frame.

9. The mounting bracket according to claim 8, wherein the second positioning mechanism comprises:
   a plurality of receptacles that are spaced along the track; and
   a catch structure that is located on the mounting assembly and that is selectively movable into and out of engagement with a selected one of the receptacles.

10. The mounting bracket according to claim 9, wherein the receptacles comprise holes and the catch structure comprises a pin that engages a selected one of the holes.

11. The mounting bracket according to claim 10, wherein the second positioning mechanism further comprises a lever that is coupled to the pin, wherein the lever can be manipulated to move the pin out of engagement with the selected one of the holes.

12. The mounting bracket according to claim 1, wherein the second positioning mechanism comprises a releasable catch.

13. The mounting bracket according to claim 1, wherein the first and second positioning mechanisms are progressively engageable.

14. A mounting bracket for supporting an electronic flight bag (EFB) component comprising:
   a frame having a track;
   a mounting assembly slidably engaging the track to slide thereon;
   the mounting assembly including a base and a support movably coupled with the base and configured for supporting the EFB component;
   a first positioning mechanism, the first positioning mechanism having an element that is moveable to engage the base to secure the support in a position with the base and then further moveable to further engage the base and simultaneously secure the mounting assembly in a position on the track;

the mounting assembly further including an upper plate and a housing attached to the upper plate, and the first positioning mechanism including a crank movable in the housing;

the movement of the crank in one direction engaging the base to secure the support at a desired orientation relative to the base and further movement of the crank in the same direction causing the upper plate to flex and secure the mounting assembly at a desired position on the track.

15. The mounting bracket according to claim 14, wherein the mounting assembly includes a lower plate and a gap is formed between the lower plate and the upper plate, further movement of the crank flexing the upper place and securing the lower plate between the track and the upper plate, and thereby, simultaneously securing the mounting assembly at the desired position on the track.

16. A mounting bracket for supporting an electronic flight bag (EFB) component comprising:

a frame having a track;

a mounting assembly slidably engaging the track to slide thereon;

the mounting assembly including an upper plate, a lower plate with a gap between the plates, a housing, a base with a socket and a support with a ball that is movably coupled with the base socket, the support configured for supporting the EFB component, the housing and the base coupled with the upper plate;

a first positioning mechanism, the first positioning mechanism having a crank element that is moveable to engage the base socket to secure the ball and support in a position with respect to the base socket, the crank element further moveable to further engage the base socket and cause the upper plate to flex and simultaneously secure the mounting assembly in a position on the track.

* * * * *